US011075996B2

(12) United States Patent
Botzer

(10) Patent No.: US 11,075,996 B2
(45) Date of Patent: Jul. 27, 2021

(54) REMOTE DASHBOARD CONSOLE

(71) Applicant: Red Hat Israel, Ltd., Raanana (IL)

(72) Inventor: David Botzer, Kfar Yona (IL)

(73) Assignee: Red Hat Israel, Ltd., Raanana (IL)

( * ) Notice: Subject to any disclaimer, the term of this patent is extended or adjusted under 35 U.S.C. 154(b) by 414 days.

(21) Appl. No.: 14/053,808

(22) Filed: Oct. 15, 2013

(65) Prior Publication Data

US 2015/0106728 A1 Apr. 16, 2015

(51) Int. Cl.
*H04L 29/08* (2006.01)
*G06F 3/0484* (2013.01)

(52) U.S. Cl.
CPC .......... *H04L 67/125* (2013.01); *G06F 3/0484* (2013.01)

(58) Field of Classification Search
CPC ............. G06F 17/30873; G06F 3/0482; G06F 3/0481; G06F 3/0483; G06F 3/011; G06F 1/163; G06F 3/016; G06F 3/0484; G06F 9/452; G06F 9/44526; H04L 67/125
USPC ........................................ 715/810, 764, 740
See application file for complete search history.

(56) References Cited

U.S. PATENT DOCUMENTS

| | | | | |
|---|---|---|---|---|
| 7,503,010 B2* | 3/2009 | Chaudhri | ............... | G06F 3/0481 715/764 |
| 7,683,771 B1* | 3/2010 | Loeb | ...................... | B60K 35/00 340/438 |
| 7,739,334 B1* | 6/2010 | Ng | ...................... | G06Q 10/107 709/205 |
| 7,954,064 B2* | 5/2011 | Forstall | ............... | G06F 3/04817 715/779 |
| 7,987,428 B2* | 7/2011 | Handy | ..................... | G06F 3/048 707/754 |
| 8,281,339 B1* | 10/2012 | Walker | ................... | G06Q 10/00 725/45 |
| 8,291,343 B2* | 10/2012 | Kobayashi | ......... | H04N 5/44543 715/810 |
| 8,320,901 B2* | 11/2012 | Klein | ............... | H04N 21/43615 455/420 |
| 8,406,961 B2* | 3/2013 | Pathak | ................ | G06F 3/03547 340/438 |
| 8,542,108 B1* | 9/2013 | Izdepski | .................. | G09G 5/00 340/438 |
| 8,595,186 B1* | 11/2013 | Mandyam | ................. | G06F 8/38 707/632 |

(Continued)

OTHER PUBLICATIONS

Danger:Remote Access to Trojans, Roger Grimes, Apr. 24, 2009, p. 13.*

(Continued)

*Primary Examiner* — Arpan P. Savla
*Assistant Examiner* — Erik V Stitt
(74) *Attorney, Agent, or Firm* — Lowenstein Sandler LLP

(57) ABSTRACT

A method, system and computer readable medium for remote control of a remote device by a remote dashboard console of a client device. The method includes identifying the remote device for management via the remote dashboard console of the client device. The remote dashboard console receives a set of plug-ins associated with multiple remote device applications installed on the remote device from a remote dashboard agent of the remote device. The remote dashboard console of the client device executes a target application of the multiple remote device applications device using a corresponding plug-in of the set of plug-ins.

12 Claims, 5 Drawing Sheets

(56) References Cited

U.S. PATENT DOCUMENTS

| | | | | |
|---|---|---|---|---|
| 8,667,415 B2* | 3/2014 | Rudolph | ............. | G06F 17/3089 715/761 |
| 8,869,027 B2* | 10/2014 | Louch | ................ | G06F 3/0481 715/700 |
| 8,892,087 B2* | 11/2014 | Ackley | ................. | G08C 17/02 340/3.1 |
| 9,134,986 B2* | 9/2015 | Ricci | ....................... | G06F 13/14 |
| 9,525,769 B1* | 12/2016 | Bauer | ................... | G06F 3/0488 |
| 2002/0085043 A1* | 7/2002 | Ribak | ................... | B60K 35/00 715/810 |
| 2004/0154040 A1* | 8/2004 | Ellis | ................... | H04N 5/44543 725/58 |
| 2005/0080799 A1* | 4/2005 | Harnden | ............... | H04L 67/125 |
| 2005/0159832 A1* | 7/2005 | Umeo | .................... | G08C 19/00 700/94 |
| 2006/0005207 A1* | 1/2006 | Louch | ........................ | G06F 8/38 719/328 |
| 2006/0107226 A1* | 5/2006 | Matthews | ............. | G06F 3/0481 715/766 |
| 2007/0038315 A1* | 2/2007 | Lin | ..................... | G05B 19/0426 700/65 |
| 2007/0061724 A1* | 3/2007 | Slothouber | ............... | G06F 8/38 715/716 |
| 2007/0288860 A1* | 12/2007 | Ording | ................ | G06F 3/04842 715/779 |
| 2008/0034314 A1* | 2/2008 | Louch | ................... | G06F 8/60 715/778 |
| 2008/0215998 A1* | 9/2008 | Moore | .................... | G06F 9/451 715/762 |
| 2008/0225875 A1* | 9/2008 | Wray | ................ | H04L 12/4633 370/419 |
| 2008/0235602 A1* | 9/2008 | Strauss | ................... | G06F 9/451 715/762 |
| 2009/0015433 A1* | 1/2009 | James | .................... | G08C 17/02 340/12.22 |
| 2009/0024944 A1* | 1/2009 | Louch | ................ | G06F 3/04817 715/764 |
| 2009/0096810 A1* | 4/2009 | Green | ................... | G06F 3/1454 345/620 |
| 2010/0017736 A1* | 1/2010 | Kim | ....................... | G08C 17/02 715/771 |
| 2010/0127847 A1* | 5/2010 | Evans | ................ | G06F 3/04817 340/461 |
| 2011/0197163 A1* | 8/2011 | Jegal | .................... | G06F 3/0482 715/811 |
| 2011/0246904 A1* | 10/2011 | Pinto | ....................... | G06F 9/452 715/740 |
| 2011/0289050 A1* | 11/2011 | McCarthy | ......... | G06F 17/30165 707/617 |
| 2012/0084662 A1* | 4/2012 | Navarro | ............. | H04N 5/44543 715/740 |
| 2012/0151606 A1* | 6/2012 | Hannon | ................... | G06F 21/83 726/29 |
| 2012/0179325 A1* | 7/2012 | Faenger | ................. | B60K 35/00 701/31.4 |
| 2013/0246584 A1* | 9/2013 | Barton | .................. | H04L 67/325 709/219 |
| 2013/0293364 A1* | 11/2013 | Ricci | ...................... | B60K 35/00 340/425.5 |
| 2013/0340011 A1* | 12/2013 | Rodriguez | ............. | G06Q 30/02 725/62 |
| 2014/0032810 A1* | 1/2014 | Kanigicherla | ........ | G06F 9/4843 710/314 |
| 2014/0096046 A1* | 4/2014 | Zhong | ................. | G06F 16/9535 715/765 |
| 2014/0118272 A1* | 5/2014 | Gunn | .................... | G06F 3/0488 345/173 |
| 2014/0118775 A1* | 5/2014 | Motamed | ............. | G06Q 10/063 358/1.15 |
| 2014/0164930 A1* | 6/2014 | Lieb | ....................... | H04W 12/06 715/730 |
| 2014/0324410 A1* | 10/2014 | Mathews | ................ | G09B 25/00 703/22 |
| 2015/0346957 A1* | 12/2015 | Louch | .................. | G06F 3/04842 715/765 |
| 2016/0164923 A1* | 6/2016 | Dawes | .................... | H04L 63/10 709/227 |
| 2016/0187862 A1* | 6/2016 | Nayak | .............. | H04N 21/41407 700/275 |

OTHER PUBLICATIONS

"Remote Control Android Phones and Tablets", BOMGAR, accessed Aug. 21, 2013, 12 pages http://www.bomgar.com/products/platforms/android.

Toohey, Remote Console v1.0—IBM Lotus Domino Remote Console Command App for your iPhone, BlackBerry, or Web Browser!, dominoGuru.com, Jul. 19, 2010, 13 pages http://www.dominoguru.com/pages/remoteconsole_v1.0.html.

* cited by examiner

REMOTE DASHBOARD CONSOLE

TECHNICAL FIELD

Embodiments of the present disclosure relate to computing environments, and more specifically, to a method and system for remotely monitoring and managing a computing device.

BACKGROUND

In many computing environment, it is desirable to connect with a "remote" computing device (e.g., a personal computer, a smartphone, etc.) using another device, to enable monitoring, management or control of the remote device. In order to effectively manage the remote device, it is advantageous to enable a user to remotely control the managed device via a user interface or dashboard which provides the user with access to the device.

DETAILED DESCRIPTION

Figure 1:
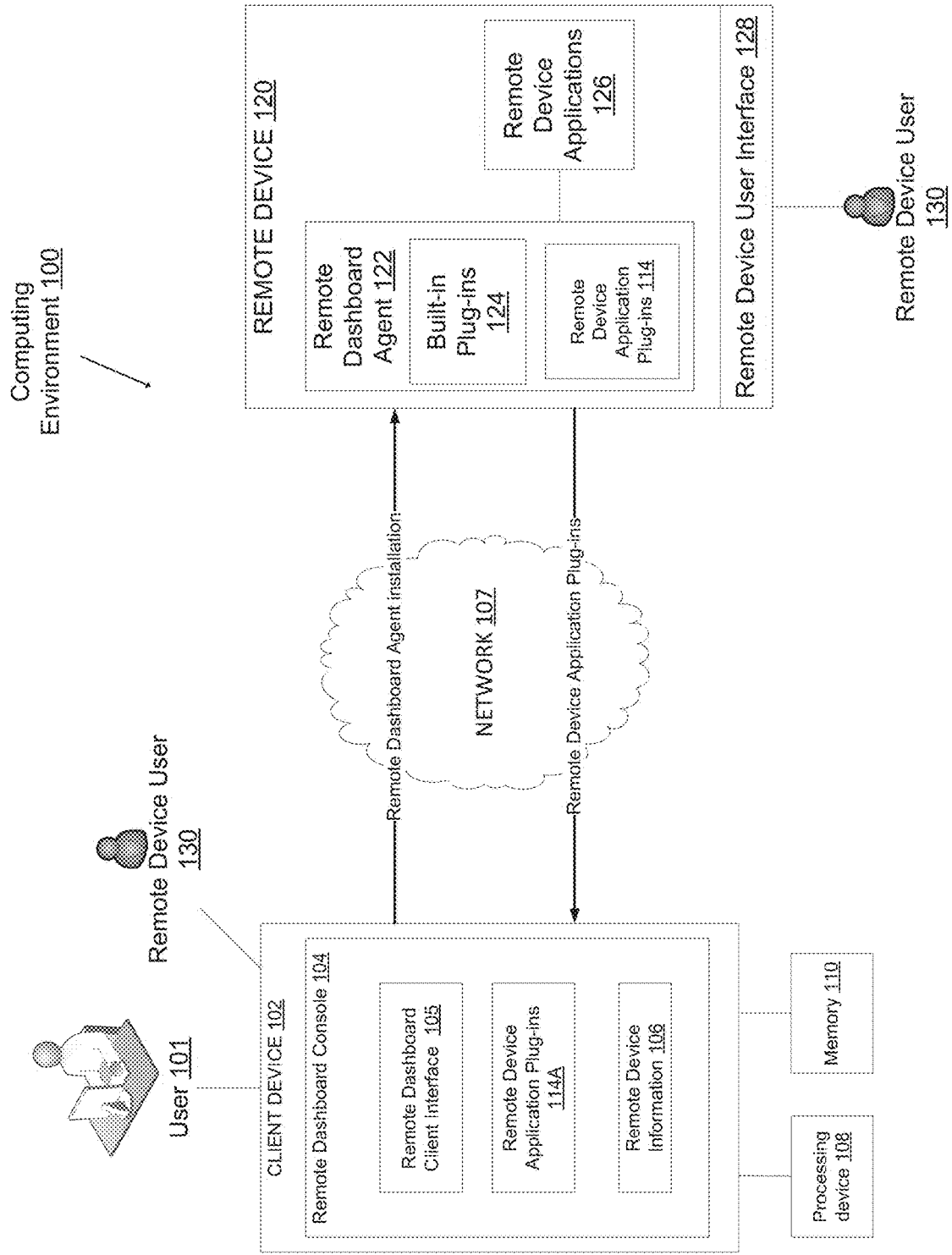
FIG. 1 is a block diagram of an example system including a remote dashboard console, according to aspects of the present disclosure.

In a computing environment including a remote computing device, it may be desired for a first computing device to manage, monitor, and/or control a second computing device. A second computing device can be a user device of an end user and can include a smart phone, a personal computer, and the like. A first computing device can be a managing device such as an administrator device or an additional user device of the end user. The first computing device can act as a client with respect to the second computing device, and the second computing device can act as a server. In the present disclosure, the first computing device is referred to as a client device, and the second computing device is referred to as a remote device or a server.

The client device may employ a "dashboard" which provides a user of the client device with a user interface providing access to one or more applications and/or programs of the remote device (one or more "remote device applications"). In many conventional systems, access to remote devices is limited to certain administrator-controlled devices and certain administrator-level users.

Furthermore, many existing remote-control management systems require a user of the remote device to provide permission each time a client device's user (e.g., an administrator) attempts to access and control the remote device. In this regard, the user of the remote device is aware of and can locally "see", via the interface of the remote device, the administrator's actions as they are performed on the remote device. As such, conventional management systems limit the ability of a user of the client device to perform actions with regard to the remote device without presenting some visual indication of the action to the user of the remote device. Although it is desirable in certain cases to allow a user of the client device to "privately" control the remote device, it is also important to establish appropriate permissions, controls and limits on the scope of actions and access to applications that is given to the user of the client device.

In this regard, a number of efficiencies may be realized by a system wherein a client device includes a remote dashboard console for connecting to a remote device (e.g., a smartphone, tablet, personal computer) to integrate with and execute applications installed on the remote device, wherein the execution workload (e.g., processing, memory consumption, etc.) is performed on the client device.

The present disclosure relates to methods and systems that provide for management and control of a remote device by a client device. Advantageously, the client device includes a remote dashboard console which allows a user of the client device to view and execute one or more applications existing on the remote device ("remote device applications") for which permission has been granted.

In an example, the remote dashboard console of the client device synchronizes with a remote dashboard agent installed on the remote device to retrieve one or more plug-ins associated with the remote device applications ("remote device application plug-ins") which the client device has been granted permission to access, execute and control. A remote device plug-in refers to any component such as a module, a plug-in, The remote device application plug-ins are stored on the client device and allow a user of the client device to execute and run the remote device applications on the client device, such that the workload (e.g., processing, memory usage, etc.) is performed by and counted on the hardware components of the client device, not the remote device. A remote device plug-in refers to any component such as a module, a plug-in, a program, etc. that can be installed on a remote device remotely from a client device and facilitate the execution of a corresponding remote device application. One or more actions performed by the client device during execution of the one or more remote device applications may not be "visible" to a user of the remote device (a "remote device user")

In an example, the remote dashboard console may be deployed as part of a graphical user interface of a virtual machine management system configured to manage multiple remote devices (e.g., VMs) in a VM computing environment. In another example, the remote dashboard console may be operated from any suitable browser application installed on the client device.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

FIG. 1 is a block diagram that illustrates an example computing environment 100 including a client device 102 including a remote dashboard console 104 in communication with one or more remote devices 120 via a network 107 (e.g., a public network such as the Internet, a private network such as a local area network (LAN), or a virtual private network (VPN)). The remote device 120 (also referred to as a "server") may be any physical or virtual machine, such as, for example, a server computer, a personal computer, a smartphone, a mobile device, a tablet, etc. For illustration purposes, FIG. 1 depicts one client device 102 for accessing and controlling one remote device 120, however, any number of client devices 102 may be employed to communicate with any number of remote devices 120, in accordance with aspects of the present disclosure.

The remote dashboard console 104 can be a software component (e.g., a set of instructions residing in a memory, such as, for example, memory 110) executable by one or more processing devices (e.g., processing device 108) to perform the remote dashboard console activities described herein (e.g., the methods described in detail in connection with FIGS. 2-3). Memory 110 may be any suitable computer readable storage medium, including volatile memory devices (e.g., random access memory (RAM)), non-volatile memory devices (e.g., flash memory), a magnetic hard disk, a Universal Serial Bus (USB) solid state drive, etc., a local disk, an external disk, and/or other types of memory devices. According to examples of the present disclosure, the remote dashboard console 104 is configured to run on any suitable operating system, such as, for example, a Red Hat Enterprise Linux (RHEL) operating system, a Microsoft Windows® operating system, etc.

According to an example, the remote dashboard console 104 includes a remote dashboard client interface 105 that allows a user (e.g., a user 101 such as an administrator permitted to access, manage, monitor, etc. the remote device 120 in the computing environment 100, a remote device user 130, etc.) to execute and run one or more remote device applications 126 (e.g., applications existing on the remote device 120). The client device 102 may be any suitable computing system, such as a server, a workstation, a personal computer (PC), a mobile phone, a palm-sized computing device, a personal digital assistant (PDA), a virtual computing system, etc. In an example, the remote dashboard client interface 105 may be any suitable graphical user interface (GUI) configured to display to a user (e.g., user 101, remote device user 130) information associated with the remote device 120 (e.g., icons, graphics, application links, files, etc.) and provide the user with the ability to access and execute the remote device applications. In an example, in addition to one or more processing devices (e.g., processing device 108) and memory (e.g., memory 110), the client device 102 may include additional hardware components (not shown) for performing the work associated with the execution of the one or more remote device applications 126, such as, for example, graphics components, peripherals, input/output devices, network cards, etc.

According to aspects of the present disclosure, a remote dashboard agent 122 is installed on the remote device 120. The remote dashboard agent 122 can be a software component (e.g., a set of instructions residing in a memory associated with the remote device 120) executable by one or more processing devices associated with the remote device 120 to communicate with the remote dashboard console 104 and perform the remote dashboard agent activities described herein (e.g., the remote dashboard agent activities associated with the methods described in detail in connection with FIGS. 2-3).

In an example, the remote dashboard agent 122 includes one or more plug-ins built into the remote dashboard agent 122 ("built-in plug-ins" 124) which provide plug-ins for applications of the client device 102 to be executed in connection with the management of the remote device 120. Exemplary built-in plug-ins 124 include, but are not limited to, a plug-in associated with a browser for use by the remote dashboard client interface 105, a camera or other video capture device plug-in, backup software plug-ins (for providing backups of the remote device applications 126), media application plug-ins, office package plug-ins (e.g., Apache OpenOffice™, Microsoft Office®, etc.), and one or more plug-ins for performance tracking applications. The performance tracking applications ("remote dashboard performance trackers") may include any application for tracking, monitoring, measuring, viewing, etc. information associated with the performance of the remote device 120. For example, the remote dashboard performance trackers may include software for collecting performance statistics, trends, and/or metrics (e.g., information relating to CPU usage, memory usage, network information, applications, processes, storage (I/O), connection status, resources, events, logs, input/output device information, and/or location information associated with the remote device 120) for display to the user 101 as a gauge or other visualization via the remote dashboard client interface 105.

In an example, the remote dashboard performance trackers can track the performance of activities between multiple different "layers" of the computing environment 100, including user/administrator and remote dashboard console activities, remote dashboard console and remote device activities, and user/administrator and remote device activities.

In an example, activities associated with the remote dashboard console 104 may be logged, such as events (e.g., the opening/closing of applications and/or plug-ins, failures/crashes in applications and/or plug-ins) and login/logout activities (e.g., including logging a username and login/logout date information for an associated login/logout activity). In an example, the login/logout activities associated with the multiple layers of the computing environment 100 may be tracked and logged, including the login/logout activity of users/administrators with respect to the remote dashboard console 104, the login/logout activity of the remote dashboard console 104 with respect to a remote device 120, and the login/logout activity of a user/administrator with respect to a remote device 120.

In an example, the remote dashboard agent 122 includes a user interface that allows a user of the remote device 120 (the "remote device user 130") to request permission for access by the client device 120 to the remote device applications 126. In an example, the remote dashboard agent 122 identifies which of the existing remote device applications of the remote device 120 the client device 102 is permitted to access and control based on a selection by the remote device user 130. For example, the remote device user 130 may be presented with a user interface such as a dialogue box or a pop up window which enables the remote device user 130 to identify the one or more remote device applications 126 that the client device 102 is permitted to access and control.

For the remote device applications 126 that the client device 102 has permission to access, corresponding plug-ins (remote device application plug-ins 114A) enabling communications with the remote device applications are provided to the remote dashboard console 104 by the remote dashboard agent 122. The remote device application plug-ins 114 on the remote device 120 side are associated with the remote dashboard agent 122 for use by the corresponding client device side remote device application plug-ins 114A in executing and running the remote device applications from the client device 102. In an example, the remote device application plug-ins 114, 114A may be placed in a "plug-ins" folder on each of the remote device 120 and the client device 102. In addition, client device 102 can receive and store information associated with the remote device 120 (the "remote device information 106"), such as information relating to and/or identifying the remote device 120 (e.g., a serial number, remote device user 130 information, operating system information, etc.). In an example, a folder labeled using the remote device information 106 may be created and stored on the client device 102 which includes the remote device application plug-ins 114A and remote device information 106 associated with the remote device 120. The remote device information 106 may be received from any suitable source, such as, for example, a user of the client device, from the remote device itself, from a virtual machine management system, etc.

In an example, the remote dashboard client interface 105 presents the user 101 of the client device 102 with a display corresponding to the remote device 120 including only the remote device applications 126 for which a corresponding remote device application plug-in 114, 114A has been installed on both the client device 102 and the remote device 120. In this regard, the remote device application plug-ins 114, 114A limit the scope of access and control the user 101 of the client device 102 has over the remote device 120, by limiting the remote device applications 126 of the remote device 120 that can be accessed and executed.

Advantageously, the remote dashboard client interface 105 provides a simplified, easy-to-navigate interface for a user of the client device 102 to view and control the remote device applications 126 of the remote device 120. In this regard, the remote dashboard client interface 105 allows a user of any suitable technical background or expertise to control the remote device 120, ranging from a user 101 such as a system administrator to and including a less-technical user of the remote device (e.g., remote device user 130). In an example, the remote device user 130 (e.g., the user of a mobile phone) may use the client device 102 including the remote dashboard console 104 to access and control his or her lost or stolen remote device 120, without needing to have a significant technical expertise or background.

In an example, the remote device 120 includes a suitable GUI (the "remote device user interface 128") for displaying information relating to the operation of the remote device 120 to the remote device user 130. In an example, during execution of the one or more remote device applications 126 by the client device 102, no visual indication is provided to the remote device user 130 via the remote device user interface 128 of the activities being performed by the client device 102. Advantageously, "hiding" the client device's activities from the remote device user 130 allows the client device 102 to perform actions which it may not wish to have the remote device user 130 be aware of, such as, for example, identifying the location of a potentially lost or stolen remote device 120, remotely turning on a camera of the remote device 120, remotely locking or shutting down the remote device 120, backing up or copying information from a potentially lost or stolen remote device, etc. In an example, the remote device user 130 may have the option to enable the viewing of activities of the client device 102 relating to the remote device applications 126.

In an example, the remote dashboard console 104 may be configured to manage permissions associated with users and user groups, including management of access permissions indicating whether a user/user group is permitted to access a particular remote device 120 or one or more particular entities or portions of a remote device 120. For example, the remote dashboard console 104 may be configured to maintain and enforce permissions relating to user/user groups access to specific applications, plug-ins, systems, etc. of a remote device 120. In an example, the remote dashboard agent 122 of the remote device 120 may be configured to manage permissions associated with users and user groups access to the remote device 120. For example, the remote dashboard agent 122 may be configured to control, manage, and/or limit the activities that may be by a user/administrator on the remote device 120.

Figure 2:
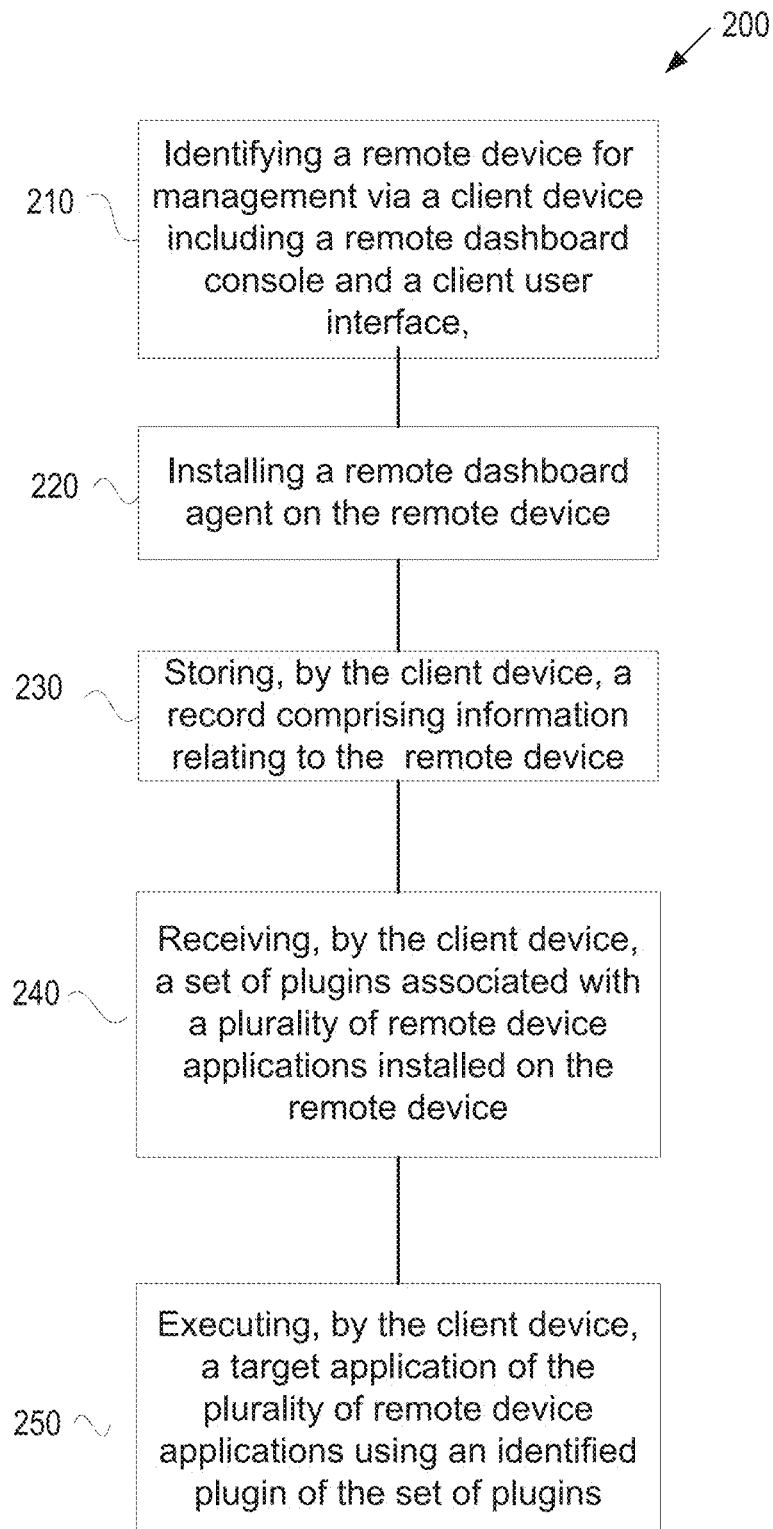
FIG. 2 is a flow diagram of an example method for management of a remote device by a client device including a remote dashboard console, according to aspects of the present disclosure.

FIG. 2 is a flow diagram illustrating an example of a method 200 for management of a remote device (e.g., remote device 120 of FIG. 1) by a client device (e.g., client device 102 of FIG. 1), according to aspects of the present disclosure. In an example, the method 200 may be performed by a module (e.g., remote dashboard console 104 in FIG. 1) that may include hardware (e.g., circuitry, dedicated logic, programmable logic, microcode, etc.), software (e.g., instructions executed by a processing device), or a combination thereof.

In block 210, a remote device is identified for management by the client device including a remote dashboard console. In an example, the remote device is identified by providing and/or adding information identifying the remote device to the remote dashboard console. The information identifying the remote device can include an IP address associated with the remote device, a phone number associated with the remote device, a fully qualified domain name (FQDN) associated with the remote device, or other similar identifying information. In an example, a user of the client device (e.g., user 101 or remote device user 130) provides the information identifying the remote device to the remote dashboard console.

In block 220, a remote dashboard agent (e.g., remote dashboard agent 122 of FIG. 1) is installed on the identified remote device. In an example, the remote dashboard agent may be installed by sending a request to install the agent to a user of the remote device. The user may provide permission for the installation of the remote dashboard agent, and the installation may be performed by the remote dashboard console via a suitable connection (e.g., connecting via a network). Alternatively, the remote dashboard agent may be installed by the remote device (e.g., installed by the remote device user).

In an example, the remote dashboard agent on the remote device identifies one or more remote device applications (e.g., the remote device application 126 of FIG. 1) for which access/execution permission is granted to the client device. For those remote device applications, a plug-in is stored in association with the remote dashboard agent, and the remote dashboard agent provides the remote device application plug-ins to the client device.

In block 230, the remote dashboard console stores a record including information relating to the remote device. In an example, the record is associated with a folder which is accessible by a user via an interface of the client device (e.g., the remote dashboard client interface 105 of FIG. 1). The folder may be labeled or otherwise identified by at least a portion of the remote device information, to allow a user to efficiently manage the remote device, particularly in cases when the client device is managing multiple remote devices.

In block 240, the remote dashboard console receives remote device application plug-ins from the remote device. It is noted that the set of remote device application plug-ins includes one or more plug-ins associated with the remote device applications for which permission to access/execute has been granted to the client device. In an example, the remote device application plug-ins may be stored in the folder associated with the remote device, described above.

In block 250, the remote dashboard console uses a corresponding remote device application plug-in from the set of remote device application plug-ins received from the remote device to execute an application (also referred to as a "first" or "target" application). In an example, the target application is run on the client device, such that the workload associated with the execution of the target application is performed and handled by the components of the client device. In this regard, advantageously, the workload moves from the remote device to the client device.

In an example, the remote dashboard console may remotely connect to a mobile phone using the associated phone number and utilize the appropriate remote device application plug-in(s) to perform a backup of the remote device, identify a current location of the remote device, lock the remote device, shutdown the remote device, launch a camera of the remote device (e.g., place the remote device in a "babysitter" or "spy" mode to view the remote device's surroundings/environment), etc. In an example, the actions and/or activities performed by the client device during execution of a target application may be transparent to a user of the remote device (e.g., no visual indications associated with the client device's activities are presented via an interface of the remote device).

Figure 3:
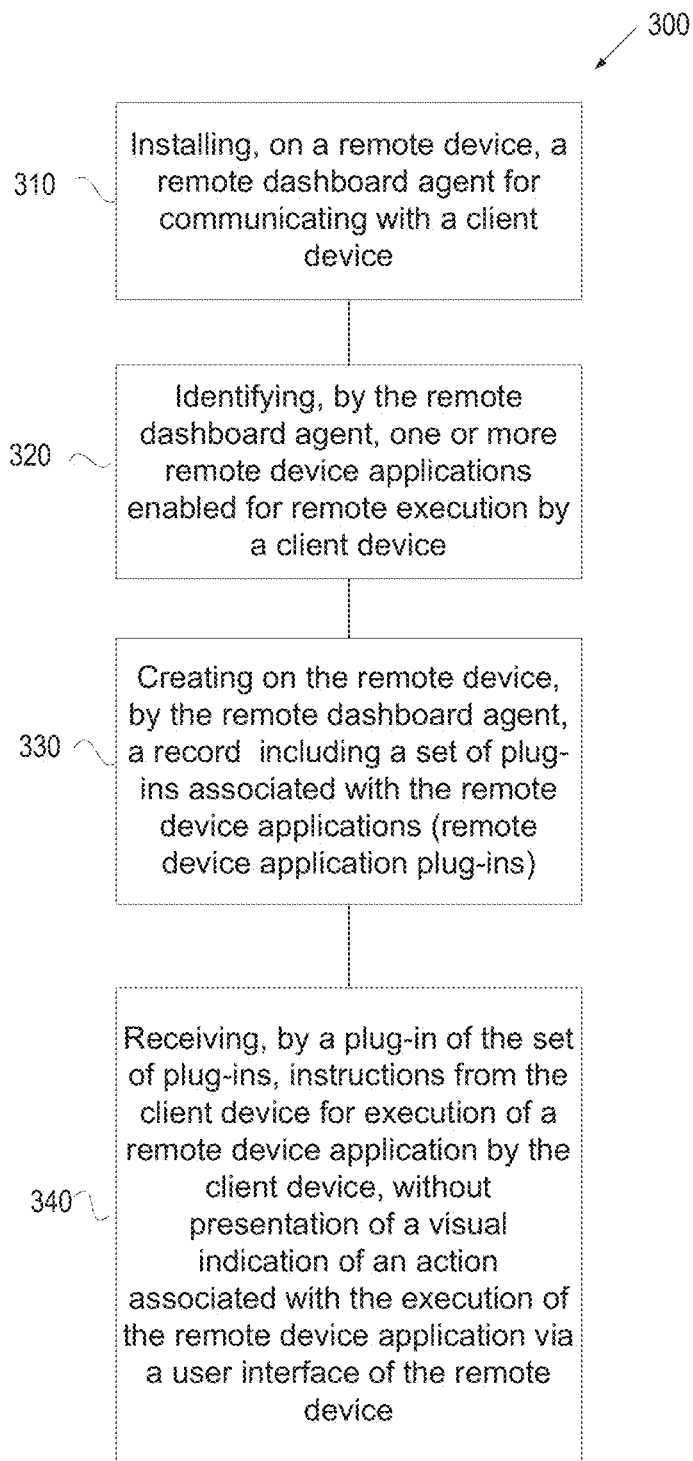
FIG. 3 a flow diagram of an example method for management of a remote device including a dashboard agent, according to aspects of the present disclosure.

FIG. 3 is a flow diagram illustrating an example of a method 300 relating to operation of a remote device (e.g., remote device 120 of FIG. 1) to be accessed and controlled by a client device (e.g., client device 102 of FIG. 1), according to aspects of the present disclosure. In an example, the method 300 may be performed by a module (e.g., remote dashboard agent 122 of FIG. 1) that may include hardware (e.g., circuitry, dedicated logic, programmable logic, microcode, etc.), software (e.g., instructions executed by a processing device), or a combination thereof.

In block 310, a remote dashboard agent is installed on a remote device to be accessed and controlled by a client device. The remote device for which installation of the remote dashboard agent can be identified by receiving, at the remote device, a request from the client device to install the remote dashboard agent. In an example, a user of the remote device (e.g., remote device user 130 of FIG. 1) provides permission to install the remote dashboard agent on the remote device, and the installation is performed via a connection between the remote device and the client device. In another example, the remote dashboard agent may be installed on the remote device (e.g., by the remote device user), and a communication confirming the installation may be sent to the client device.

In an example, the remote dashboard agent includes built-in plug-ins associated with applications of the client device to be executed in connection with management of the remote device 120. For example, the built-in plug-ins may include plug-ins associated with client-side applications relating to the measurement, tracking, and capture of information, statistics, and/or metrics relating to the performance and/or operation of the remote device. Exemplary built-in plug-ins may also include plug-ins associated with a browser, media applications, office applications, etc.

In block 320, the remote dashboard agent identifies one or more remote device applications to enable remote execution of the remote device's applications by the client device. In an example, the remote device application plug-ins are used by the client device (e.g., the remote dashboard console) to execute the remote device applications via the remote dashboard client interface of the client device. In an example, the remote dashboard agent scans the remote device to identify the applications installed on the remote device. In an example, a list of the applications identified in the scan is presented to a user of the remote device, the user selects one or more remote device applications for which permission to access and execute is granted to the client device. In an example, access/execution permission may be granted to the client device for all of the applications identified in the scan.

In block 330, the remote dashboard agent creates and stores a record on the remote device including a set of plug-ins associated with the remote device applications. In an example, the set of remote device application plug-ins correspond to the remote device applications for which the client device has been granted access. In an example, the remote dashboard agent transmits the remote device application plug-ins to the client device. In another example, the remote dashboard transmits the remote device application plug-ins to the client device in response to a request for same from the client device. In an example, the remote dashboard agent may grant permission to the client device to access and retrieve the remote device application plug-ins for installation on the client device.

When a client device seeks to access and execute a remote device application (also referred to as a "first remote device application" or a "target remote device application"), a plug-in of the set of plug-ins on the remote device receives one or more instructions from the client device relating to the execution of the target remote device application, in block 340. In an example, the use of the plug-in by the client device and the execution and running of the associated remote device application is transparent to a user of the remote device. In an example, the execution of the remote device application by the client device is without presentation, via the user interface of the remote device, of a visual indication of actions by the client device relating to the execution of the remote device application. For example, a remote device user operating the remote device may not be presented with any visual cues or indications (e.g., pointer movement, file activity, new pop up windows, etc.) via the display of the remote device. According to an example of the present disclosure, a setting may be activated on the remote device which enables the remote device to display all or a portion of the activity of the client device during execution of the one or more remote device applications.

Figure 4:
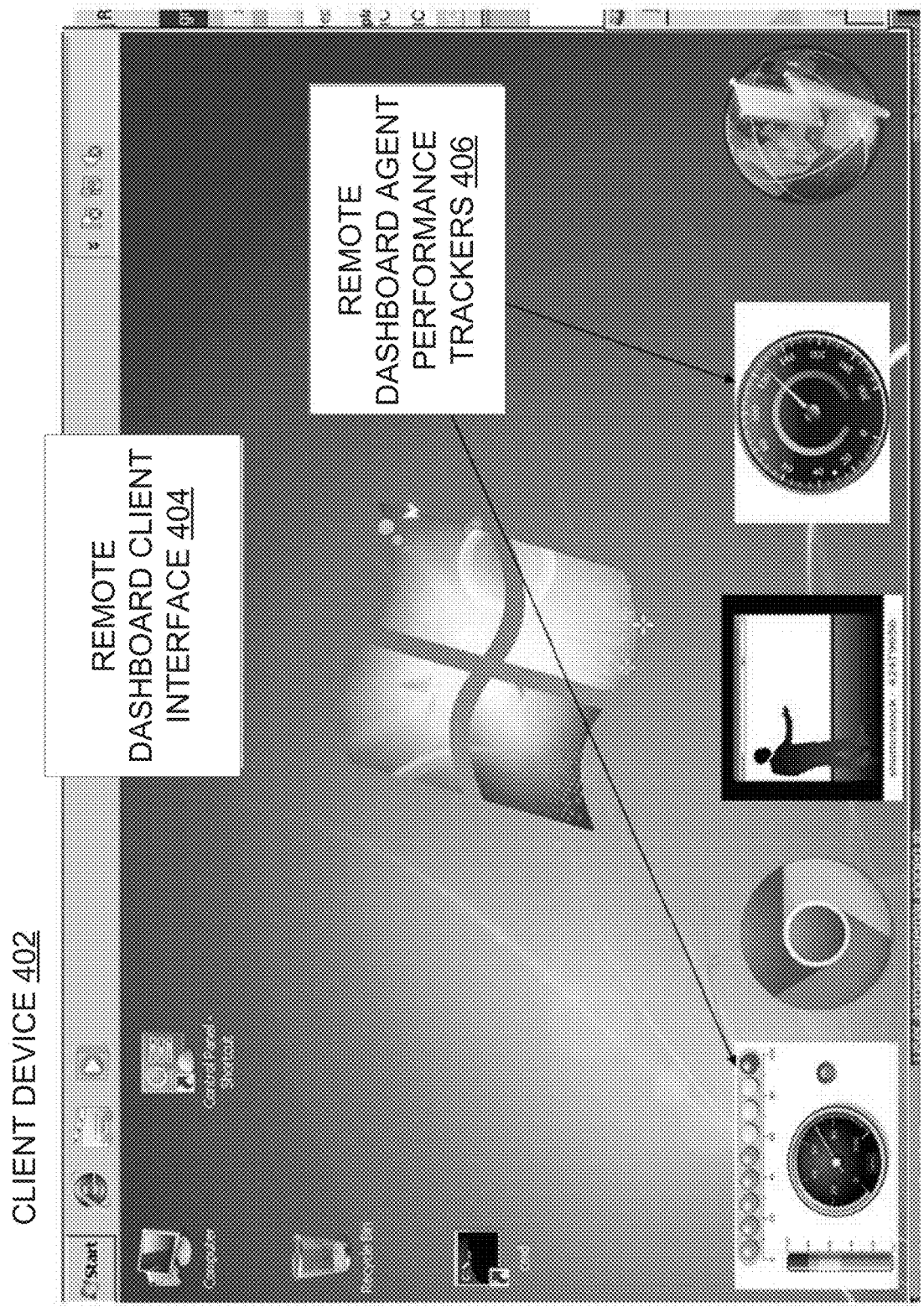
FIG. 4 is a block diagram of an example method for management of a remote device including a dashboard agent, according to aspects of the present disclosure.

FIG. 4 illustrates an exemplary remote dashboard client interface 404 of a client device 402. As shown, the remote dashboard client interface 404 illustrates a display from a perspective of a user of the client device (e.g., a system administrator). According to aspects of the present disclosure, the remote dashboard client interface 404 displays multiple remote dashboard performance trackers 406. As described above, the remote dashboard performance trackers 406 may be any application used to track, monitor, and/or manage performance metrics of the remote device, as collected by the remote device. In an example, the performance information may be collected by the one or more built-in plug-ins of the remote dashboard agent on the client device and sent from the remote device to the client device for access via the remote dashboard agent performance trackers 406.

Figure 5:
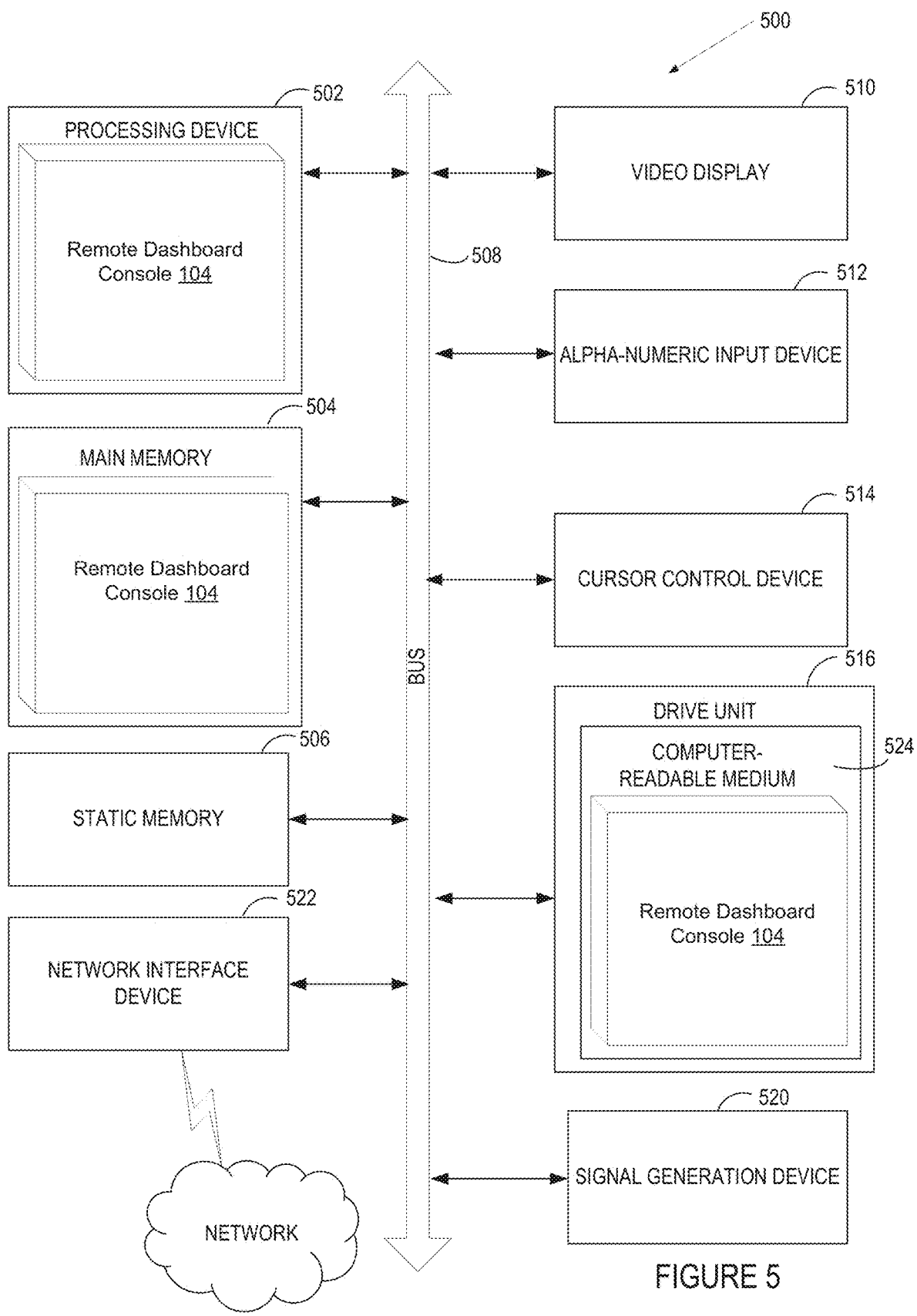
FIG. 5 illustrates a diagrammatic representation of a system including a remote dashboard console, according to aspects of the present disclosure.

FIG. 5 illustrates an example computer system including a remote dashboard console 104 configured to perform any one or more of the methodologies and functions described herein. In alternative examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. According to an aspect of the present disclosure, the illustrative computer system 500 may be composed of multiple different computer systems configured to execute the remote dashboard console 104.

The illustrative computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device (or drive unit) 516, which communicate with each other via a bus 508.

Processing device 502 (e.g., a processor) represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the remote dashboard console 104 to perform the operations discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 for storing instructions associated with the remote dashboard console 104 (e.g., instructions corresponding to the methods and functions described in connection with FIGS. 1-4 and embodying any one or more of the methodologies or functions described herein). The instructions of the remote dashboard console 104 may also reside, completely or at least partially, within the main memory 504 and/or within the processing device 502 during execution thereof by the computer system 500, the main memory 504 and the processing device 502 also constituting non-transitory computer-readable media. Instructions executable by the remote dashboard console 104 may further be transmitted or received over a network via the network interface device 522.

While the computer-readable storage medium 524 is shown in an illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent and/or alternating manner.

In the foregoing description, numerous details have been set forth. It will be apparent, however, to one skilled in the art, that examples of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "identifying", "installing", "storing", "receiving", "executing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, examples of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Examples of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Many other examples will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    identifying, by a processing device on a client device, a remote device to be managed by the client device via a remote dashboard console executable by the processing device on the client device, wherein the remote device comprises a graphical interface;
    transmitting, by the processing device on the client device to the remote device, a remote dashboard agent to be installed on the remote device, wherein the remote dashboard agent scans the remote device to identify a plurality of remote device applications installed on the remote device that the client device has been granted a permission by the remote device to execute, wherein each of the plurality of remote device applications are selected by a user of the remote device via a dialogue box to establish the permission;
    receiving, by the remote dashboard console on the client device from the remote dashboard agent installed on the remote device, a first set of plug-ins configured to control execution of the plurality of remote device applications identified by the remote dashboard agent as having been granted the permission to execute;
    installing, by the client device, a first plug-in of the set of plug-ins, the first plug-in configured to communicate with a corresponding plug-in of the remote dashboard agent to enable control of a target application; and
    executing on the remote device, by the processing device on the client device using the first plug-in of the set of plug-ins, the target application of the plurality of remote device applications, wherein, prior to the executing of the target application, configuring, by the remote dashboard agent, the graphical interface of the remote device to not display any visual indication corresponding to any activity occurring during and as a result of the execution by the client device of the target application on the remote device, wherein a processing workload corresponding to the executing of the target application is performed by one or more hardware components of the client device.

2. The method of claim 1, wherein the client device is limited to execution of the plurality of remote device applications corresponding to the set of plug-ins received from the remote device.

3. The method of claim 1, wherein the remote dashboard agent comprises a plurality of built-in plug-ins.

4. The method of claim 3, wherein the plurality of built-in plug-ins correspond to a plurality of applications executable on the remote device by the client device.

5. A non-transitory computer readable storage medium including instructions that, when executed by a processing device of a client device, cause the processing device of the client device to:
    identify, by the processing device on the client device, a remote device to be managed by the client device via a remote dashboard console executable by the processing device of the client device, wherein the remote device comprises a graphical interface;
    transmit, by the processing device on the client device to the remote device, a remote dashboard agent to be installed on the remote device, wherein the remote dashboard agent scans the remote device to identify a plurality of remote device applications installed on the remote device that the client device has been granted a permission by the remote device to execute, wherein the plurality of remote device applications are selected by a user of the remote device via a dialogue box to establish the permission;
    receive, by the remote dashboard console on the client device from the remote dashboard agent installed on the remote device, a first set of plug-ins configured to control execution of the plurality of remote device applications identified by the remote dashboard agent as having been granted the permission to execute;
    install, by the processing device of the client device, a first plug-in of the set of plug-ins, the first plug-in configured to communicate with a corresponding plug-in of the remote dashboard agent to enable control of a target application; and
    execute on the remote device, by the processing device on the client device using the first plug-in of the set of plug-ins, the target application of the plurality of remote device applications, wherein, prior to the executing of the target application, configuring, by the remote dashboard agent, the graphical interface of the remote device to not display any visual indication corresponding to any activity occurring during and as a result of the execution by the client device of the target application on the remote device, wherein a processing workload corresponding to the executing of the target application is performed by one or more hardware components of the client device.

6. The non-transitory computer readable storage medium of claim 5, wherein the client device is limited to execution of the plurality of remote device applications corresponding to the set of plug-ins received from the remote device.

7. The non-transitory computer readable storage medium of claim 5, wherein the remote dashboard agent comprises a plurality of built-in plug-ins.

8. The non-transitory computer readable storage medium of claim 7, wherein the plurality of built-in plug-ins correspond to a plurality of applications executable on the remote device by the client device.

9. A system comprising:
    a memory to store instructions; and a processing device of a client device operatively coupled to the memory, the processing device to execute the instructions to:
    identify, by the processing device on the client device, a remote device to be managed by the client device via a remote dashboard console executable by the processing device of the client device, wherein the remote device comprises a graphical interface;
    transmit, by the processing device on the client device to the remote device, a remote dashboard agent to be installed on the remote device, wherein the remote dashboard agent scans the remote device to identify a plurality of remote device applications installed on the remote device that the client device has been granted a permission by the remote device to execute, wherein the plurality of remote device applications are selected by a user of the remote device via a dialogue box to establish the permission;
    receive, by the remote dashboard console on the client device from the remote dashboard agent installed on the remote device, a first set of plug-ins configured to control execution of the plurality of remote device applications identified by the remote dashboard agent as having the permission to execute;
    install, by the processing device of the client device, a first plug-in of the set of plug-ins, the first plug-in configured to communicate with a corresponding plug-in of the remote dashboard agent to enable control of a target application; and
    execute on the remote device, by the processing device on the client device using the first plug-in of the set of plug-ins, the target application of the plurality of remote device applications, wherein, prior to the executing of the target application, configuring, by the remote dashboard agent, the graphical interface of the remote device to not display any visual indication corresponding to any activity occurring during and as a result of the execution by the client device of the target application on the remote device, wherein a processing workload corresponding to the executing of the target application is performed by one or more hardware components of the client device.

10. The system of claim 9, wherein the client device is limited to execution of the plurality of remote device applications corresponding to the set of plug-ins received from the remote device.

11. The system of claim 9, wherein the remote dashboard agent comprises a plurality of built-in plug-ins.

12. The system of claim 11, wherein the plurality of built-in plug-ins correspond to a plurality of applications executable on the remote device by the client device.

* * * * *